(No Model.)  2 Sheets—Sheet 2.

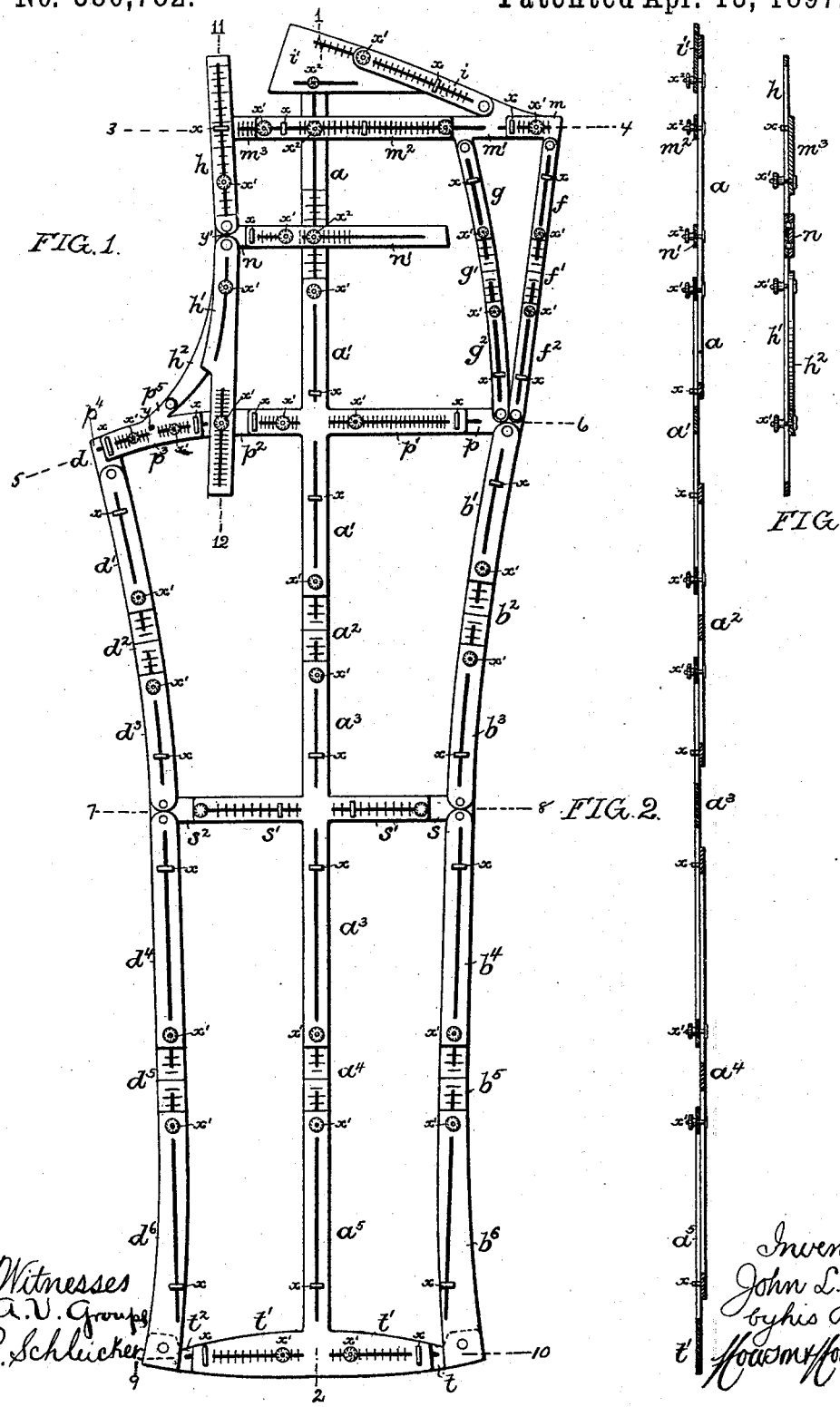

J. L. FRY.
ADJUSTABLE PATTERN FOR DRAFTING TROUSERS.

No. 580,782.  Patented Apr. 13, 1897.

Witnesses:
A. V. Groupe
R. Schleicher.

Inventor
John L. Fry
by his Attorneys
Howson & Howson

UNITED STATES PATENT OFFICE.

JOHN L. FRY, OF PHILADELPHIA, PENNSYLVANIA, ASSIGNOR, BY DIRECT AND MESNE ASSIGNMENTS, TO MICHAEL TRUHAN, OF SAME PLACE.

ADJUSTABLE PATTERN FOR DRAFTING TROUSERS.

SPECIFICATION forming part of Letters Patent No. 580,782, dated April 13, 1897.

Application filed October 26, 1891. Renewed February 27, 1897. Serial No. 625,392. (No model.)

*To all whom it may concern:*

Be it known that I, JOHN L. FRY, a citizen of the United States, and a resident of Philadelphia, Pennsylvania, have invented certain Improvements in Adjustable Patterns for Drafting Trousers, of which the following is a specification.

The object of my invention is to provide a pattern for trousers which is so constructed that it can be used for drafting both the back and front pieces of the trousers and is susceptible of such a variety of adjustments as to permit of the accurate laying out of the trousers in accordance with any given measurements. These objects I attain in the manner hereinafter set forth, reference being had to the accompanying drawings, in which—

Figure 3:
Figure 4:
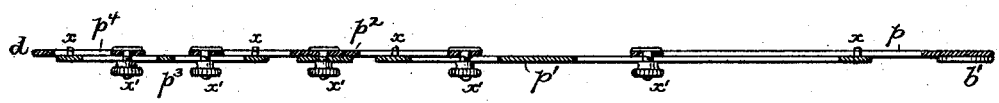
Figure 5:
Figure 6:

Figure 1 is a view of my improved adjustable trousers-pattern. Fig. 2 is a longitudinal section on the line 1 2, Fig. 1. Fig. 3 is a transverse section on the line 3 4, Fig. 1. Fig. 4 is a transverse section on the line 5 6, Fig. 1. Fig. 5 is a transverse section on the line 7 8, Fig. 1. Fig. 6 is a transverse section on the line 9 10, Fig. 1; and Fig. 7 is a longitudinal section on the line 11 12, Fig. 1.

I will first enumerate the various parts of the pattern before attempting to describe the detailed constructions and connections or the manner of using the pattern.

There are a series of central longitudinal slides $a$, $a'$, $a^2$, $a^3$, $a^4$, and $a^5$; another series of longitudinal slides $b'$, $b^2$, $b^3$, $b^4$, $b^5$, and $b^6$, which may be termed "outer leg-slides," and a third series of longitudinal slides $d$, $d'$, $d^2$, $d^3$, $d^4$, $d^5$, and $d^6$, which may be termed "inner leg-slides," and in addition to these longitudinal slides there are two shorter sets of longitudinal slides $f$, $f'$, and $f^2$ and $g$, $g'$, and $g^2$, which are adapted to form continuations of the outer leg-slides and which may be termed "hip-slides," and another shorter set of longitudinal slides $h$, $h'$, and $h^2$, which may be termed "crotch-slides," operating in conjunction with the inner leg-slides. In addition to these longitudinal slides there are a number of sets of transverse slides—namely, slides $i$ $i'$, which may be termed "back or rear waist-slides;" slides $m$, $m'$, $m^2$, and $m^3$, which may be termed "front waist-slides;" slides $n$ and $n'$, which may be termed "intermediate" slides; slides $p$, $p'$, $p^2$, $p^3$, and $p^4$, which may be termed "transverse hip-slides;" slides $s$, $s'$, and $s^2$, which may be termed "knee-slides," and slides $t$, $t'$, and $t^2$, which may be termed "bottom" slides.

All of the slides of each series are slotted in the direction of their length, and the slotted portions of the slides of each series overlap each other and are provided with guide-pins $x$ and clamping-bolts $x'$, so that each series of slides can be expanded or contracted in the direction of its length and secured in position after adjustment, and the slides of each series are provided with properly-numbered graduations, so that the adjustment of any one of the series of slides may be readily regulated to accord with any given series of measurements.

The central longitudinal slide $a$ is also slotted for the reception of clamp-bolts $x^2$, adapted to slots in certain of the transverse slides— that is to say, in the rear waist-slide $i'$, in the front waist-slide $m^2$, and in the intermediate slide $n'$. The transverse hip-slide $p'$ forms part of the central longitudinal slide $a'$, and the knee-slide $s'$ forms part of the central slide $a^3$, and the bottom slide $t'$ forms part of the central slide $a^5$.

The crotch-slides $h$ $h'$ are pivoted to the slide $n$, and the crotch-slide $h^2$ is pivoted to a tongue $p^5$ on the transverse hip-slide $p^3$, the slide $p^4$ forming part of the uppermost of the inner leg-slides $d$, which is pivoted to the next slide $d'$ of the series, the slides $d^3$ and $d^4$ being pivoted to the knee-slide $s^2$, and the lowermost slide $d^6$ being pivoted to the bottom slide $t^2$. In like manner the front leg-slide $b'$ is pivoted to the transverse hip-slide $p$. The slides $b^3$ and $b^4$ are pivoted to the knee-slide $s$, and the slide $b^6$ is pivoted to the bottom slide $t$.

The rear hip-slide $f$ is pivoted to the waist-slide $m$, and the slide $f^2$ is pivoted to the transverse hip-slide $p$, and the front hip-slide $g$ is pivoted to the waist-slide $m'$ and the slide $g^2$ to the transverse hip-slide $p$, the rear waist-slide $i$ being pivoted to an arm on the front waist-slide $m'$.

The rear hip-slides $f$, $f'$, and $f^2$ form a substantially straight continuation of the outer leg-slides, while the front hip-slides $g$, $g'$, and $g^2$ form an inwardly-curved continuation of said outer leg-slides, and the crotch-slide $h^2$ is curved outwardly from the slide $h'$ to the arm $p^5$ on the transverse hip-slide $p^3$.

The rear waist-slide $i'$ is of triangular form, the upper and inner sides of the same being substantially at right angles to each other, and on the transverse hip-slide $p^3$, about midway of the length of the same, is a guide-mark $y$ for a purpose hereinafter described.

Supposing that the pattern has been adjusted in its various parts to accord with the measurements for a given pair of trousers, the manner of marking off the cloth for the front and back pieces of the trousers is as follows: For each of the front pieces the line is started, say, at the junction of the front waist-slide $m^3$ and the crotch-slide $h$. The line is then drawn along the inner side of said slide $h$, part way along the inner side of the slide $h'$, and along the inner side of the slide $h^2$ to its junction with the slide $p^3$. The line then extends from this point downward until it merges with the curve formed by the inner side of the inner leg-slide $d^3$, being then continued down along the inner sides of the slides $d^4$, $d^5$, and $d^6$, along the tops of the bottom slides $t^2$, $t'$, and $t$, along the inner sides of the outer leg-slides $b^6$, $b^5$, $b^4$, $b^3$, $b^2$, and $b'$, and along the inner sides of the front hip-slides $g^2$, $g'$, and $g$ to the top of the front waist-slides, and thence along the same to the outer side of the top crotch-slide $h$, and along the outer sides of the slides $h$, $h'$, and $h^2$ and arm $p^5$ to the junction of the latter with the slide $p^3$. A line is then drawn from this point to the inner side of the slide $d^3$, where it meets the line previously drawn to this point. This gives a double line at the crotch, the distance between the two lines representing the amount of "dress" at the crotch which is allowed on the front piece for one leg, the extra material being removed from the front piece for the other leg. For the rear portions of the trousers the outer lines of the slides are followed. For instance, starting at the upper angle of the rear waist-slide $i'$ the line is drawn along the upper sides of the slides $i'$, $i$, and $m$, thence along the outer sides of the rear hip-slides $f$, $f'$, and $f^2$, thence along the outer sides of the outer leg-slides $b'$, $b^2$, $b^3$, $b^4$, $b^5$, and $b^6$, thence beneath the bottom slides $t$ $t'$ $t^2$, thence along the outer sides of the inner leg-slides, thence along the outer sides of the slide $p^3$, arm $p^5$, and slide $h^2$ until it meets a line drawn upward from the point $y$ to a guide-point $y'$ at the junction of the slides $h$ $h'$, and thence to the inner angle of the rear waist-slide $i'$.

One of the main features of my invention is the provision of the two sets of longitudinal hip-slides, so that the same pattern is adapted without change for marking out both the front and back pieces of the trousers, and this feature of my invention may be employed with advantage in patterns differing as regards their other parts from that which I have described, the main object of the invention being to provide a single pattern from which, without any change in the original adjustment, all pieces necessary to form the trousers may be properly drafted.

Having thus described my invention, I claim and desire to secure by Letters Patent—

1. An adjustable trousers-pattern having a single set of outer leg-slides and front and rear hip-slides meeting at the top of said outer leg-slides and adapted to be used in conjunction therewith for drafting both the front and rear pieces of the trousers, substantially as described.

2. The combination of the leg-slides, hip-slides, and rear waist-slides, with the transverse hip-slides and the crotch-slides each provided with a guide-mark for use in connection with each other, and with one of the rear waist-slides, substantially as specified.

In testimony whereof I have signed my name to this specification in the presence of two subscribing witnesses.

JOHN L. FRY.

Witnesses:
EUGENE ELTERICH,
HARRY SMITH.